May 1, 1928.

C. E. JOHNSON 1,667,807

WASTE PACKED BEARING FOR MOTORS

Filed June 10, 1925     2 Sheets-Sheet 1

INVENTOR:
CARL E. JOHNSON,
BY
Fred W. Lewis
ATTORNEY.

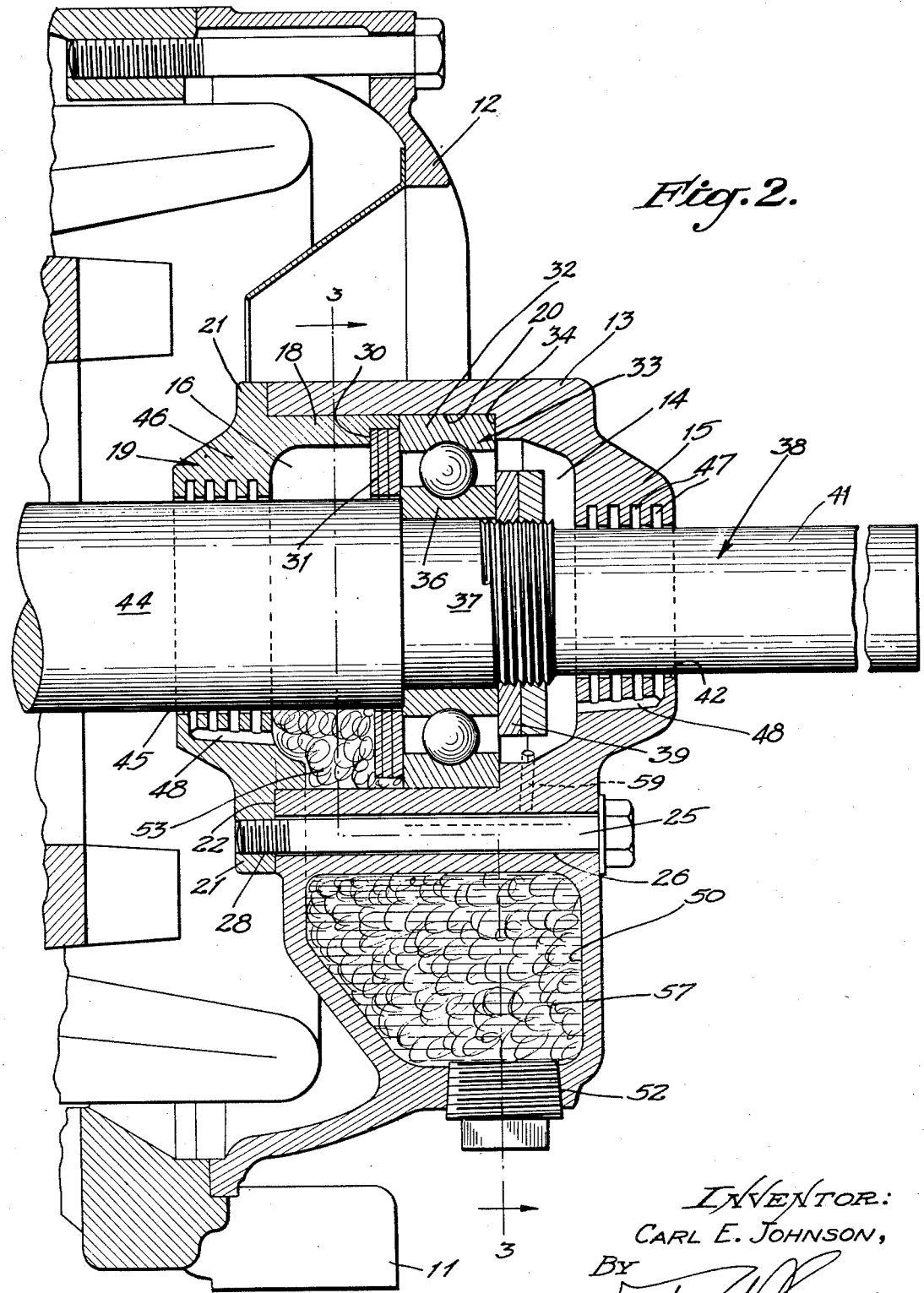

Patented May 1, 1928.

1,667,807

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA.

WASTE-PACKED BEARING FOR MOTORS.

Application filed June 10, 1925. Serial No. 36,239.

This invention relates to bearing and lubricating means and it is designed especially for use on electric motors or on any other devices where it is highly desirable to have oil lubricated bearings which will not demand frequent attention.

It is an object of my invention to provide a means for lubricating a bearing over a long period of time without refilling or without any other attention.

Another object of my invention is to provide a lubricating device of this character which will supply lubricant steadily to a bearing as it is used thereby.

It is a still further object of this invention to provide an arrangement of the character mentioned which will not leak.

Other objects and advantages of my invention will be explained hereinafter.

Referring to the two sheets of drawings in which I illustrate a preferred form of my invention, Fig. 1 is an end view of a motor using the bearing and lubricating arrangement of my invention.

Fig. 2 is an enlarged fragmentary section of my invention taken substantially on the line 2—2 of Fig. 1.

Figure 1:
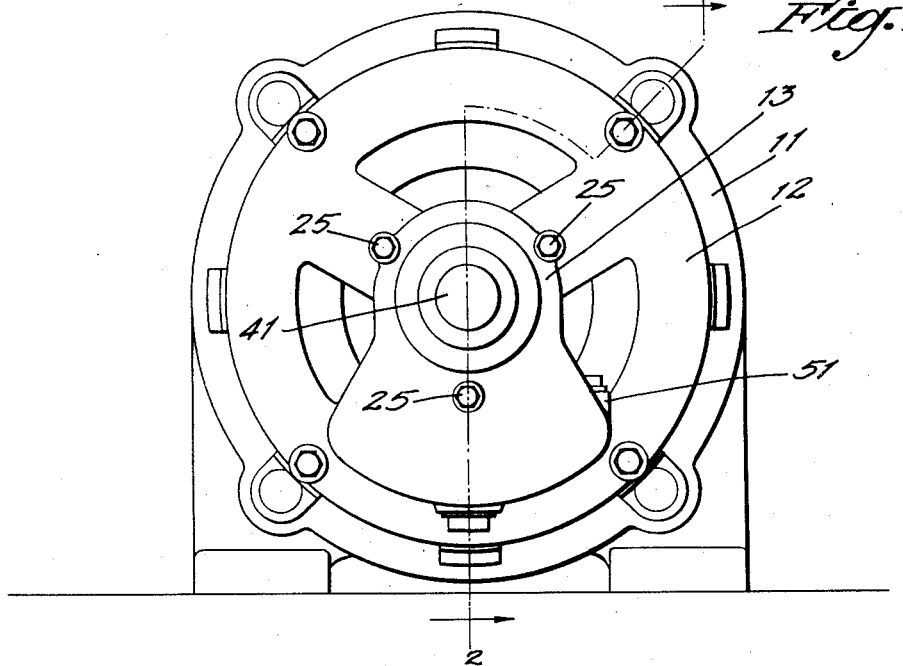

The form of my invention shown in the drawings is designed for use on a motor 11. An end frame 12 of the motor 11 is provided with a central cup 13 which provides a bearing cavity 14. The outer end of the cavity 14 is closed by a radial wall 15, whereas the inner end 16 of the cavity is open. A cylindrical projection 18 of a closure member 19 extends into the open end 16 of the cavity 14, the outer face of the cylindrical projection 18 fitting closely with an inner cylindrical face 20 of the cavity 14. A flange 21 of the closure member 19 engages an end face 22 of the cup-shaped member 13. Bolts 25 extend through openings 26 in the cup-shaped member 13, these bolts being threadably secured in openings 28 formed in the flange 21, thus securing the closure 19 tightly in place. An annular shoulder 30 engages a felt washer 31, compressing it against an outer race 32 of a bearing 33. The outer race 32 is therefore clamped against a shoulder 34 formed in the bearing cavity 14.

An inner race 36 is clamped on a portion 37 of a shaft 38 by a pair of nuts 39. A reduced portion 41 of the shaft 38 extends through an opening 42 in the radial wall 15 of the cup-shaped member 13. A large portion 44 of the shaft 38 extends through an opening 45 in a boss 46 of the closure 19. Surrounding the openings 42 and 45 are annular oil catch channels 47 which connect at their lower parts to drains 48. Any oil tending to pass from the bearing cavity 14 is centrifugally thrown into the channels 47 and drains back to the cavity 14 through the drain passages 48.

Formed below the bearing cavity 14 is an oil chamber 50 having a filling opening 51 which is closed by a plug, as shown, and having a drain opening 52 which is likewise closed by a plug. The upper and rear part of the oil chamber 50 is provided with an opening 53 and the cylindrical projection 18 of the closure 19 is cut away to provide a gap 54, the opening 53 and the gap 54 providing communication between the oil chamber 50 and the bearing cavity 14.

Figure 3:
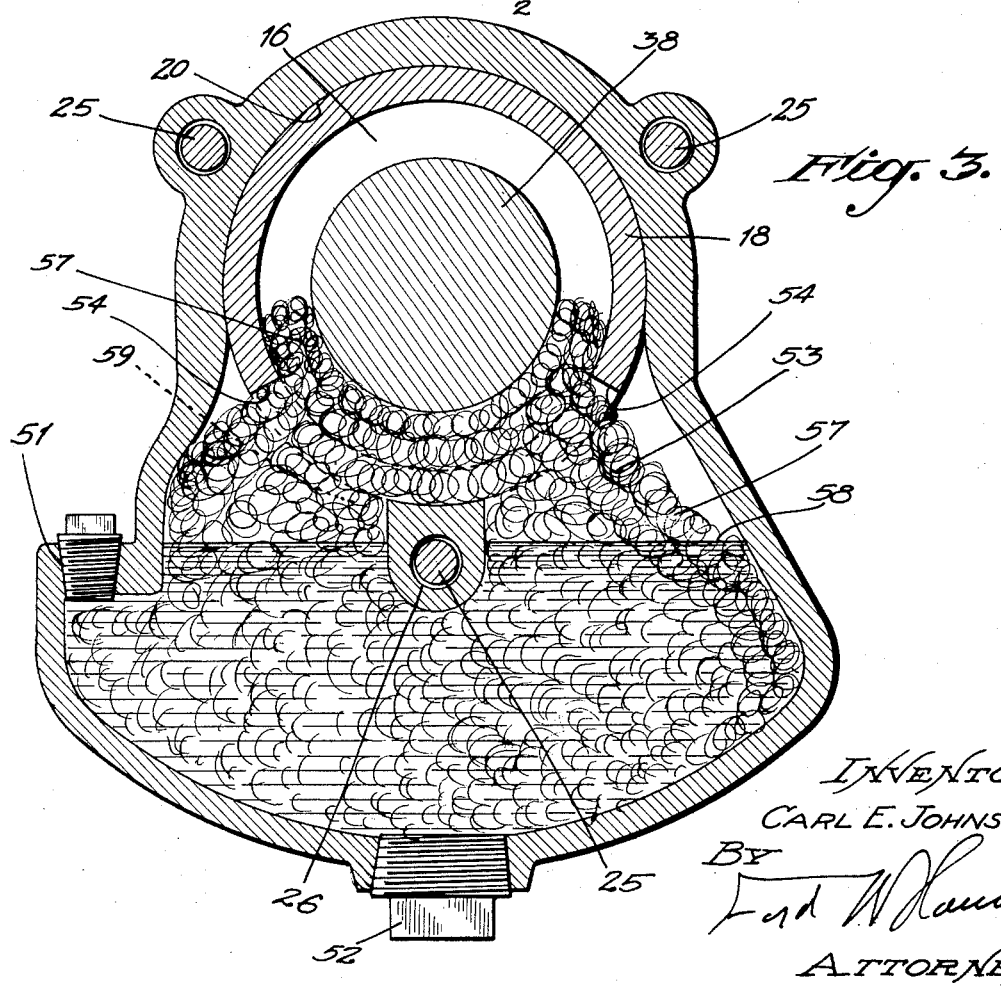
Fig. 3 is a section taken on the line 3—3 of Fig. 2.

Placed in the oil chamber 50 and in the lower and inner part of the bearing cavity 14 is an oil absorbing material 57 which is preferably a wool waste, but may be any substance which will absorb oil. As clearly shown in Fig. 3 the oil absorbing material contacts with a portion of the shaft 38, the material however being confined in the space between the boss 46 of the closure 19 and the felt washer 31. Oil is placed in the oil chamber 50 through the opening 51 to a level indicated at 58. The oil absorbing material tends to become saturated with the oil in the chamber 50 which gradually creeps up to the shaft 38. As the shaft rotates the oil is collected thereon and flows therealong passing through the felt washer 31 to the bearing 33, the felt washer thus controlling the amount of oil fed to the bearings. Any oil collecting in the outer part of the cavity 14 may drain back to the chamber 50 through openings 59. Any oil tending to pass to the exterior of the bearing cavity 14 is caught by the oil catch channels 47 and is delivered to the cavity 14 through the drain passages 48.

The oil absorbing material 57 acts as a wick and supplies oil to the felt washer 31 which distributes said oil evenly to the bearing 33 as required. The bearing does not remain in the body of oil but is supplied with sufficient oil for thorough lubrication. There will be, therefore, no waste of oil and there will be practically no leakage from the cavity 14. The feeding system of my invention will supply lubrication to the bearing 33 over a long period of time and will not demand attention, and it will not be necessary to refill the chamber 50 for considerable periods of time because there will be a small consumption of oil due to the fact that there is no waste of oil.

I claim as my invention:

1. In a bearing construction, the combination of: a journal box into which a shaft is adapted to extend; an anti-friction bearing disposed in said box and receiving said shaft, said bearing having annular races rotatable relative to each other, there being a cavity formed in said box extending beneath the level of said bearing in which a lubricant reservoir may be formed; an annular washer formed of compactly pressed absorptive material and engaging said races to prevent foreign matter entering through an annular space into said bearing; and means for feeding lubricant from said reservoir to said annular washer, said lubricant being transmitted to said bearing by said washer.

2. In a bearing construction, the combination of: a journal box into which a shaft is adapted to extend; an anti-friction bearing disposed in said box and receiving said shaft said bearing having annular races rotatable relative to each other, there being a cavity formed in said box extending beneath the level of said bearing in which a lubricant reservoir may be formed; an annular washer formed of felt and engaging said races to prevent foreign matter entering through an annular space into said bearing; and means for feeding lubricant from said reservoir to said annular washer, said lubricant being transmitted to said bearing by said washer.

3. In a bearing construction, the combination of: a journal box into which a shaft is adapted to extend; an anti-friction bearing disposed in said box and receiving said shaft, said bearing having annular races rotatable relative to each other, there being a cavity formed in said box extending beneath the level of said bearing in which a lubricant reservoir may be formed; an annular washer formed of compactly pressed absorptive material and engaging said races to prevent foreign matter entering through an annular space into said bearing; and a wick for feeding lubricant from said reservoir to said annular washer, said lubricant being transmitted to said bearing by said washer.

4. In a bearing construction, the combination of: a journal box into which a shaft is adapted to extend; an anti-friction bearing disposed in said box and receiving said shaft, said bearing having annular races rotatable relative to each other, there being a cavity formed in said box extending beneath the level of said bearing in which a lubricant reservoir may be formed; an annular washer formed of felt and engaging said races to prevent foreign matter entering through an annular space into said bearing; and a wick for feeding lubricant from said reservoir to said annular washer, said lubricant being transmitted to said bearing by said washer.

5. In a bearing construction, the combination of: a journal box into which a shaft is adapted to extend; an anti-friction bearing disposed in said box and receiving said shaft, said bearing having annular races rotatable relative to each other, there being a cavity formed in said box extending beneath the level of said bearing in which a lubricant reservoir may be formed, said cavity opening into communication with a mouth of a central annular space between said races; an annular absorbent washer closing said mouth to prevent foreign matter entering therein; a wall in said box substantially shutting said cavity from another mouth of said annular space, there being drain ducts passing through said wall; and means for feeding lubricant from said reservoir to said annular washer, said lubricant being transmitted to said bearing by said washer.

6. In a bearing construction, the combination of: a journal box into which a shaft is adapted to extend; an anti-friction bearing disposed in said box and receiving said shaft, said bearing having annular races rotatable relative to each other, there being a cavity formed in said box extending beneath the level of said bearing in which a lubricant reservoir may be formed, said cavity opening into communication with a mouth of a central annular space between said races; an annular absorbent washer closing said mouth to prevent foreign matter entering therein; a wall in said box substantially shutting said cavity from another mouth of said annular space, there being drain ducts passing through said wall; and a wick for feeding lubricant from said reservoir to said annular washer, said lubricant being transmitted to said bearing by said washer.

In testimony whereof, I have hereunto set my hand at Los Angeles, California, this 5th day of June, 1925.

CARL E. JOHNSON.